United States Patent [19]
Friesen et al.

[11] Patent Number: 5,266,283
[45] Date of Patent: Nov. 30, 1993

[54] STERICALLY HINDERED, REGENERABLE SCHIFF BASE COMPLEXES, SOLUTIONS THEREOF AND PROCESS USING THE SAME

[75] Inventors: Dwayne T. Friesen; Warren K. Miller; Bruce M. Johnson; David J. Edlund, all of Bend, Oreg.

[73] Assignee: Bend Research, Inc., Bend, Oreg.

[21] Appl. No.: 522,523

[22] Filed: May 11, 1990

[51] Int. Cl.$^5$ .................. C01B 13/02; C07F 7/00; C07F 9/00

[52] U.S. Cl. .................. 423/219; 252/184; 423/579; 556/32

[58] Field of Search .............. 252/184; 423/579, 219; 556/32

[56] References Cited

U.S. PATENT DOCUMENTS

| | | | |
|---|---|---|---|
| 2,450,276 | 9/1947 | Fogler et al. | 556/32 |
| 3,248,410 | 4/1966 | Berenbaum | 556/32 |
| 3,472,876 | 10/1969 | Klein | 556/32 |
| 3,787,464 | 1/1974 | Neri et al. | 556/32 |
| 4,451,270 | 5/1984 | Roman | 55/38 |
| 4,542,010 | 9/1985 | Roman et al. | 423/579 |
| 4,746,748 | 5/1988 | Aoki et al. | 556/32 |
| 4,985,053 | 1/1991 | Sugie | 423/219 |

FOREIGN PATENT DOCUMENTS

| | | | |
|---|---|---|---|
| 1668669 | 1/1973 | Fed. Rep. of Germany | 556/32 |
| 3302498 | 7/1984 | Fed. Rep. of Germany | 556/32 |
| 135485 | 6/1987 | Japan | 556/32 |
| 142191 | 6/1987 | Japan | 556/32 |
| 142192 | 6/1987 | Japan | 556/32 |

*Primary Examiner*—Wayne A. Langel
*Attorney, Agent, or Firm*—Chernoff, Vilhauer, McClung & Stenzel

[57] ABSTRACT

There are disclosed saltmen-type metallo Schiff base complexes and oxygen-sorbing and -desorbing solutions of the same, pressure- and temperature-swing oxygen separation processes using the complexes and solutions, and methods of regenerating such complexes and solutions.

52 Claims, 4 Drawing Sheets

STERICALLY HINDERED, REGENERABLE SCHIFF BASE COMPLEXES, SOLUTIONS THEREOF AND PROCESS USING THE SAME

BACKGROUND OF THE INVENTION

A pressure- and temperature-swing process utilizing oxygen carriers in solution to sorb and desorb oxygen is known. See U.S. Pat. No. 4,451,270, where broad classes of oxygen carriers in solution with axial bases are described; included in those carriers disclosed are Schiff base metal complexes of alkyl-substituted N-N'-bis(-salicylidene)tetramethylethylenediamine, commonly referred to as "saltmen." European Patent Application Publication No. 0 304 818 discloses an oxygen separation membrane comprising a permselective film formed by an in situ interfacial polymerization reaction of Co(salen) with certain polymers. Two of the principal problems which interfere with the proper functioning of saltmen complexes as practical oxygen carriers is their tendency to form mu-peroxo dimers, which renders them inactive as carriers, and to bind oxygen irreversibly, which renders them incapable of regeneration. Another drawback of such saltmen complexes as oxygen carriers is that many of them go into solution only at undesirably high temperatures, rendering their use in a pressure- or temperature-swing sorption/desorption process impractical. Still another drawback of such complexes as carriers has been their low solubility in low-polarity solvents, which tends to limit the rate of oxygen production to nonfeasible, low levels, and does not permit the exclusion of water from the solvent or solvent mixture (water deactivates carriers directly and by the formation of carbonic acid with the carbon dioxide in air). A still further problem with such complexes as carriers has been that of ascertaining those with an oxygen-binding equilibrium constant that is sufficiently high to bind or sorb oxygen at a commercially feasible temperature and oxygen pressure, yet sufficiently low to desorb oxygen, the sorption and desorption taking place under conditions of moderate pressure and temperature.

The foregoing shortcomings of saltmen complexes as oxygen carriers are addressed and resolved by the present invention, which is summarized and described in detail below.

SUMMARY OF THE INVENTION

Figure 1:
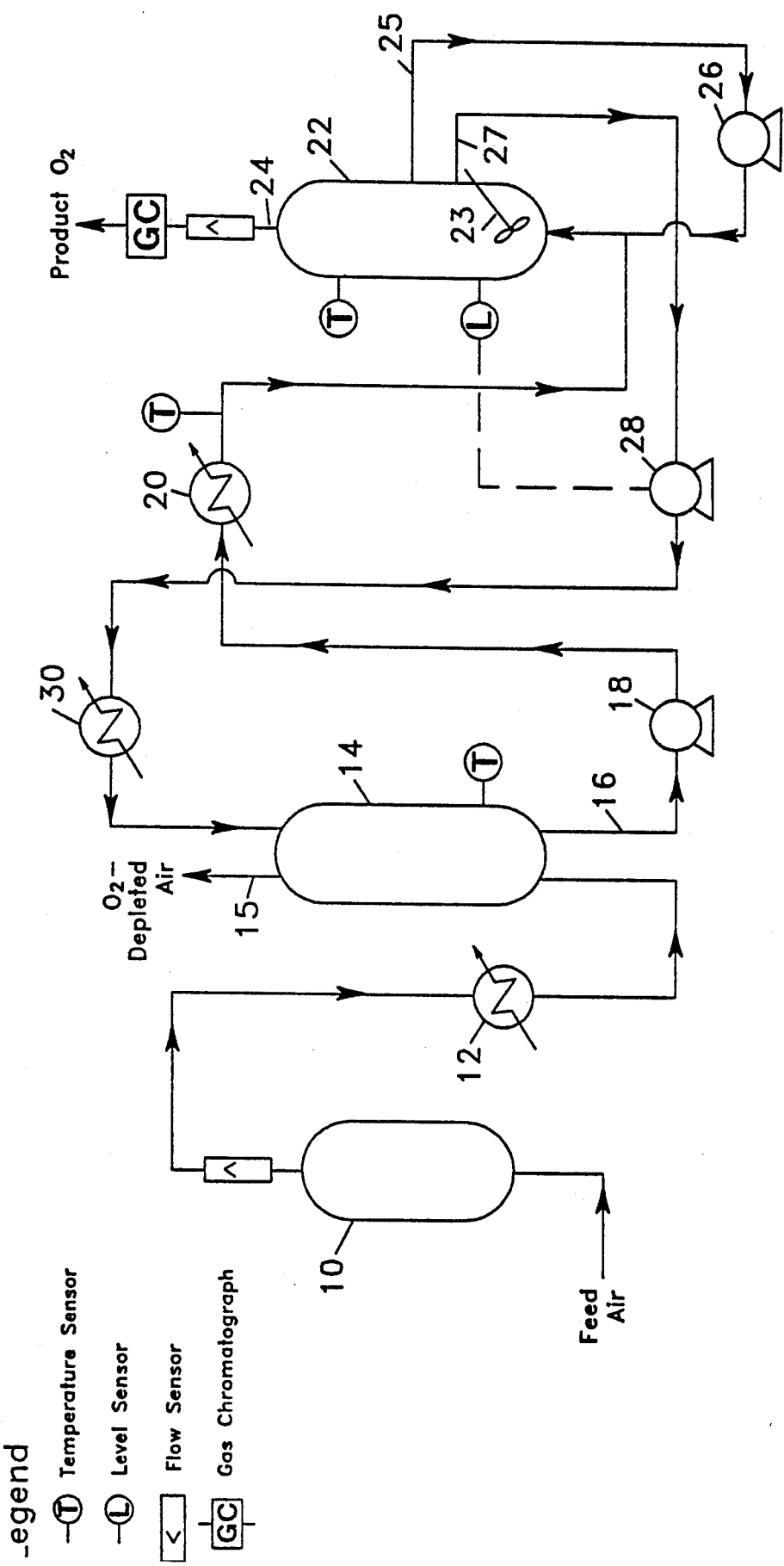
FIG. 1 is a schematic of exemplary apparatus used in the temperature-swing absorption/desorption process of the present invention.

The present invention comprises a class of sterically hindered, tertiary alkyl-substituted saltmen-type metallo Schiff base complexes, certain solutions thereof, and a sorption process using the complexes and solutions. The class of saltmen-type complexes is of the structural formula

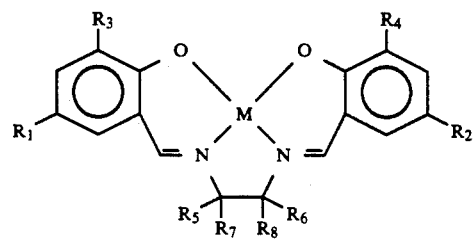

where

M is a +2 valence metal selected from Co, Fe, Cu, Ni, Mn, Ru and Rh;

$R_1$ and $R_2$ are selected from tertiary alkyl groups containing from 4 to 8 carbon atoms;

$R_3$ and $R_4$ are selected from $R_1$ and $R_2$ and 1-methylcyclohexyl;

$R_5$ and $R_6$ are selected from linear alkyl groups containing from 1 to 8 carbon atoms; and $R_7$ and $R_8$ are selected from $R_5$, $R_6$ and, taken together, a butylene group.

Oxygen-sorbing and -desorbing solutions of such saltmen-type complexes consist essentially of a solvent, an axial base and the metallo Schiff base saltmen complex, the axial base being capable of providing a coordinating atom to the saltmen complex, the solvent being selected from linear and branched chain alkyl-, ester- and halogen-substituted aromatic hydrocarbons, mixtures thereof, and mixtures thereof with linear and branched-chain non-aromatic hydrocarbons, halocarbons, and esters.

The process for the separation of oxygen comprises contacting an oxygen-containing feed stream with a solution of the present invention, thereby sorbing oxygen from the feed stream, and then desorbing oxygen from the solution by either heating the solution or bringing the solution into contact with a gaseous product stream having an oxygen partial pressure substantially less than the oxygen partial pressure of the feed stream.

Such sterically hindered metallo Schiff base complexes in the solutions of the invention resist dimer formation, are regenerable by a variety of methods, have lifetimes of up to 12 months and longer, readily at ambient to moderately high temperature, have relatively high solubility in low-polarity solvents, and have desireable oxygen-binding equilibrium constants. The pressure- and temperature-swing sorption process utilizing the complexes and solutions thereof provide consistently high yields of oxygen from oxygen-containing feeds.

DETAILED DESCRIPTION OF THE INVENTION

According to the present invention, there are provided a class of sterically hindered metallo Schiff base complexes and certain solutions thereof of the type described above that possess a desireable balance of those characteristics necessary to achieve practical commercial utility of a pressure- or temperature-swing oxygen sorption/desorption process.

The preferred +2 valence metal for the complex is Cobalt(II), while the most preferred saltmen structure is 3,3',5,5'-tetra-t-butylsaltmen. For convenience, such symmetrically-substituted complexes will be referred to by the substitution on one of the aromatic rings only; for example, in the case of 3,3',5,5'-tetra-t-butylsaltmen, the nomenclature used herein will be "3,5-di-t-butylsaltmen." It should be understood, however, that the present invention is not intended to be limited to symmetrically-substituted saltmen structures. Other especially preferred tertiary alkyl-substituted saltmen-type structures are the symmetrically-substituted 3,5-di-t-amyl-saltmen, 5-t-amyl-3-t-butylsaltmen, 3-t-butyl-5-t-octyl-saltmen, 3,5-di-t-butylsaltmpen (N,N'-bis(salicylidene)-1-propyl-1,2,2-trimethylethylenediamine), 5-t-butyl-3-(1-methylcyclohexyl)saltmen and 3,5-di-t-butylsal-(1,2-dimethylcyclohexylene-1,2-diimine).

Synthesis of the sterically hindered saltmen complex carriers of the present invention is preferably accomplished by first reacting the appropriate 3,5-di-t-alkyl-salicylaldehyde with the appropriate diamine, then with a Cobalt salt in an inert atmosphere, both reactions taking place in a solvent such as methanol and with the addition of heat. In the case of Co(II)(3,5-di-t-butylsaltmen), an exemplary reaction scheme is shown below:

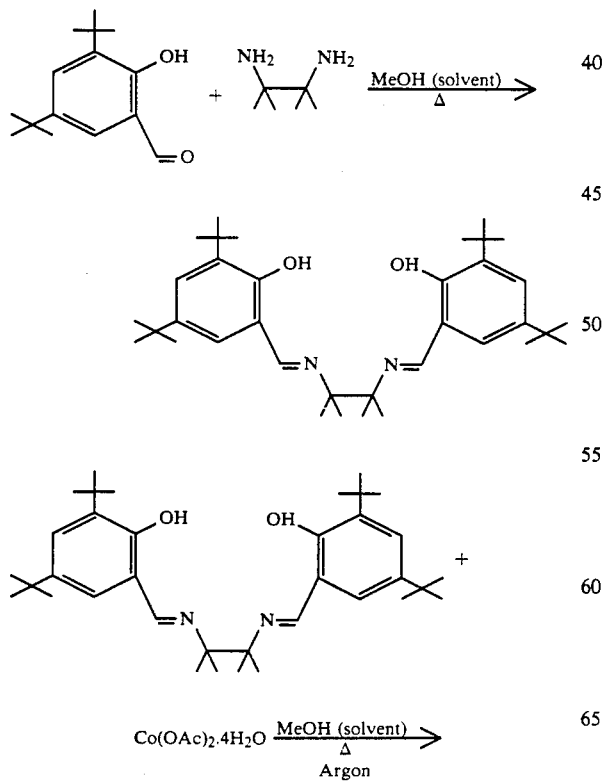

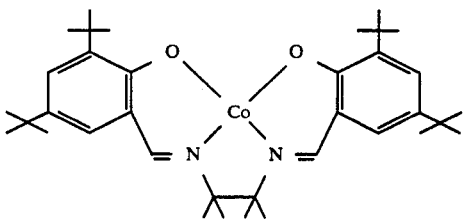

The component salicylaldehyde may be synthesized by the following exemplary scheme:

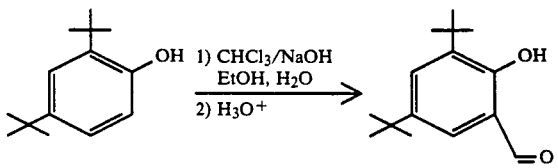

In general terms, the solvent for most of the Schiff base complexes of the present invention should have the following properties:

hydrophobic;
aromatic;
non-sterically-hindered;
either incapable of coordinating or capable of only weakly coordinating with the oxygen-binding site;
carrier solubility of at least 0.1M, preferably, 0.25 to 0.5M, and at least 80% of its solubility limit;
solubility of oxygenated form of the Schiff base complex is one to two orders of magnitude less than the solubility of the non-oxygenated form, permitting phase separation of the oxygenated form of the complex; and
leads to a carrier solution having an apparent oxygen-binding constant of at least 0.01 cmHg$^{-1}$ at 0° C., preferably 0.01-2 cmHg$^{-1}$ Preferably, solvents should also have low volatility (b.p. of at least 200°), low toxicity and high flash points, although such properties may be unnecessary in large-scale commercial oxygen production. Suitable solvents having such properties may generally be described as alkyl-, alkylene-, ester- and halogen-substituted aromatic hydrocarbons, preferably containing 1 or 2 benzene rings. "Alkyl" substituents include linear alkyl and branched alkyl groups. Lower alkyl-substituted benzenes are a preferred subset of such hydrocarbon solvents. By "linear alkyl" is meant straight chain hydrocarbon groups having from 1 to 22 carbon atoms. "Branched alkyl" is meant to include branched chain hydrocarbon groups containing 3 to 10 carbon atoms. "Lower alkyl" is meant to include straight and branched-chain hydrocarbon groups containing from 1 to 8 carbon atoms. "Alkylene" includes alkylene groups containing from 3 to 5 carbon atoms. "Ester" is meant to include aliphatic and aromatic acid and alcohol residues containing 2 to 20 carbon atoms attached to the aromatic ring by an ester linkage. "Halogen" has its usual meaning of those members of group VIIA of the periodic chart, i.e., fluorine, chlorine, bromine, etc.

Examples of linear lower alkyl-substituted aromatics are toluene, xylene (all isomers), ethyl-, propyl-, butyl-, pentyl- and hexylbenzene, and 1-methylnaphthalene. An example of an aromatic hydrocarbon with an alkylenyl substituent is 1,2,3,4-tetrahydronaphthalene. Examples of suitable branched alkyl-substituted aromatics are 2-isopropylnaphthalene, Cycosol 63 (alkylbenzene solvent made by Shell Chemical Co. of Houston, Tex.), Dodane H ($C_4$-$C_6$ branched chain alkylbenzene solvent made by Monsanto Co. of Carson, Calif.), Suresol 250 (mono-isopropylbiphenyl solvent made by Koch Chemical Co. of Corpus Christi, Tex.), and Suresol 290 (mono-sec-butylbiphnnyl solvent also made by Koch Chemical Co.). Examples of suitable ester-substituted omatics are butylbenzoate, Finsolv TN ($C_{12}$-$C_{15}$ alkyl benzoate solvent made by Fintax, Inc. of Elmwood Park, N.J.), 1-phenylethyl propionate, diethyl phthalate, 2-phenylethyl acetate, benzyl acetate, benzylacetoacetate, and benzylphenyl acetate. Examples of suitable halogen-substituted aromatic hydrocarbons are ortho dichloro- and difluorobenzene, 1-fluoronaphthalene, and chloronaphthalene (both isomers).

In addition, mixtures of such solvents are useful in the present invention, as well as mixtures of the same solvents with linear and branched-chain non-aromatic hydrocarbons, halocarbons, and esters containing 6 to 20 carbon atoms. In many cases, such mixtures include "poor" solvents that, when used alone, yield unacceptably low oxygen-binding constants, yet, when mixed with "good" solvents, yield excellent oxygen-binding performance. The utility of such mixtures of "poor" and "good" solvents is that they allow lower concentrations of carriers that still yield phase separation (discussed below) of the oxygenated carrier, thus making useful those carriers that tend to have prohibitively high viscosities at high carrier concentrations.

Axial bases should be capable of providing a coordinating atom to the saltmen Schiff base complex. Preferred classes are nitrogen-containing Lewis bases such as pyridines, imidazoles, amides and amines. The most preferred axial bases are 4-(N,N-dimethylamino)pyridine (DMAP), 1-methylimidazole (MeIm), and 4-(N-methylpiperidino)pyridine (MPP). In general, the axial base should be present in an amount of at least 1.5 equivalents per equivalent of oxygen carrier.

The basic process for the separation of oxygen from an oxygen-containing feed gas comprises contacting the feed gas with a solution of the invention to absorb oxygen therefrom, then desorbing oxygen from the solution, the desorption being conducted by heating the solution (temperature swing), by bringing it into contact with a gaseous product stream having an oxygen partial pressure substantially less than that of the feed stream (pressure-swing), or by a combination of temperature- and pressure-swing desorption.

Figure 2:
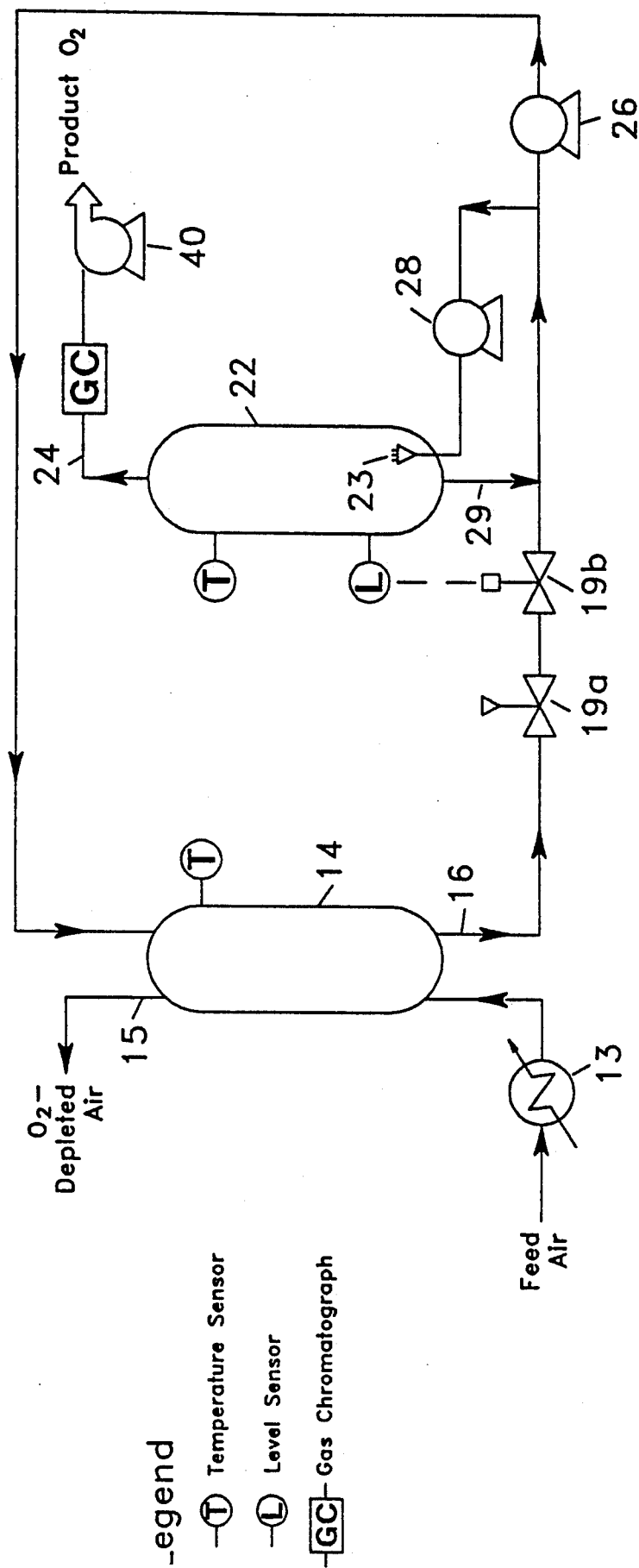
FIG. 2 is a schematic of exemplary apparatus used in the pressure-swing absorption/desorption process of the present invention.

Referring now to the drawings, wherein like numerals designate the same elements and the same legends are used, FIGS. 1 and 2 are schematics of exemplary apparatus for practicing the temperature- and pressure-swing processes, respectively.

As shown in FIG. 1, feed air is first fed to a water scrubber unit 10 to remove the same by absorption, then to a heat exchanger 12 to cool the feed before introduction to an oxygen sorption column 14 provided with a temperature sensor and containing Schiff base complex oxygen carrier solution. Oxygen-depleted air is vented by vent 15, while carrier solution containing sorbed oxygen is removed by line 16 operatively connected to variable speed gear pump 18, and thence to a heating heat exchanger 20, then to gas/liquid separator 22 provided with temperature and level sensors and a stirrer 23. Variable speed gear pump 28 continuously empties separator 22 of carrier solution, and is responsive to the level of solution in the separator. Oxygen gas is removed by product line 24; its purity is monitored by a gas chromatograph. Carrier solution containing residual amounts of complexed oxygen is recirculated to the separator 22 via recycle line 25 and diaphragm pump 26. Spent carrier solution is recycled to the sorption column 14 via line 27, a variable speed gear pump 28 and cooling heat exchanger 30.

As shown in FIG. 2, feed air is first fed to a combination cooling and drying heat exchanger 13 to cool and dry the feed before introduction to an oxygen sorption column 14 provided with a temperature sensor and containing oxygen carrier solution. Oxygen-depleted air is vented by vent 15, while carrier solution containing sorbed oxygen is removed by line 16 operatively connected to variable speed gear pump 28 via manual needle valve 19a and motor-driven valve 19b (valve 19b is responsive to the level of solution in the separator 22). Separator 22 is provided with temperature and level sensors and with a spray head 23 that is connected to pump 28. A lower oxygen partial pressure is provided in the separator by vacuum pump 40, and oxygen is removed from the separator via line 24; its purity is monitored by a gas chromatograph. Carrier solution is recycled both to the separator for further oxygen gas stripping, and to the sorption column 14 by line 29, variable speed pump 28, and diaphragm pump 26.

In formulating and using solutions according to the present invention, an interesting phenomenon was observed. Without wishing to be bound by any theory, it appears that phase separation of microcrystalline oxygenated complex drives the oxygenation reaction to completion, and so one may substantially increase oxygen loading by increasing Schiff base complex concentration up to the solubility limit of its unoxygenated form. For example, using the equation $$K_{O2} = \frac{1}{P_{O2}} \cdot \frac{X}{(1-X)} \quad (I)$$

where $K_{O2}$ is the apparent oxygen-binding constant for a carrier, $P_{O2}$ is the final oxygen partial pressure, and X is the mole fraction of carrier that is complexed to oxygen (whether in solution or precipitated), and assuming that $K_{O2}$ is 0.0625 $cmHg^{-1}$, that the carrier is half saturated with oxygen when equilibrated with air at an oxygen partial pressure of 16 cmHg, and that the total carrier concentration (oxygenated plus unoxygenated) is 0.1M, then the concentration of both oxygenated carrier and unoxygenated carrier is 0.05M. Assume that the solubility limit of oxygenated carrier is also 0.05M. Upon addition of more carrier to the solution, at oxygenation equilibrium, equal concentrations of oxygenated and unoxygenated carrier will be maintained. Since the solubility limit for oxygenated carrier of 0.05M cannot be exceeded, all carrier above a total concentration of 0.1M will be converted to the oxygenated form and will phase-separate from solution as a crystalline solid. Thus, upon increasing the above solution from 0.1M to 0.2M total carrier concentration, the concentration of oxygenated carrier will remain at the saturation value of 0.05M, unoxygenated carrier will remain at 0.05M by equilibrium with oxygenated carrier, and "0.1M" of the carrier phase-separates in the oxygenated form. Oxygen loading is now 75% rather than the 50% oxygen loading at lower concentration, and the apparent $K_{O2}$ is 0.188 $cmHg^{-1}$. Addition of further carrier up to its solubility limit—say a concentration of 0.4M—would yield an apparent $K_{O_2}$ value of 0.44 cmHg$^{-1}$.

Solutions of metallo Schiff base complex oxygen carrier according to the present invention are very stable toward irreversible oxidation, and after some loss of oxygen sorption capacity over time may be regenerated to their original oxygen sorption capacity by a variety of regeneration techniques. These regeneration techniques include: (1) heating either the oxygen carrier or its solution from 30° C. to 180° C. while excluding water and oxygen; (2) stripping the solvent from the solution and then recrystallizing the solid carrier residue from a suitable solvent in an inert atmosphere; (3) stripping the axial base from the carrier solution; and (4) demetallating the carrier in solution by addition of strong acid, extracting the liberated carrier ligand into an organic solvent, removing the organic solvent at high temperature and reduced pressure, coordinating the +2 valence metal ion to the carrier ligand, then recrystallizing the carrier.

In connection with the first regeneration method mentioned above, oxygen may be excluded by conducting the heating (a) under a vacuum of from 0.2 to 20 cmHg from about 4 to about 48 hours, or (b) in an inert gas atmosphere such as nitrogen or argon from about 4 to about 72 hours.

In connection with the second regeneration method, inactive carrier may be isolated from carrier solution by first removing carrier solvent, such as by rotoevaporation to leave inactive carrier and axial base, which may then be refluxed in an inert gas atmosphere with a suitable recrystallization solvent such as acetonitrile or an alcohol containing from 1 to 3 carbon atoms.

In connection with the third method of regeneration, the oxygen affinity of the carrier may be greatly reduced by removing the axial base. Removing the axial base from the inactive oxygenated-carrier will destabilize the carrier-oxygen bond and the carrier will rapidly dissociate to unoxygenated carrier and unbound oxygen. Three methods for removing the axial base from inactive oxygenated-carrier species are (a) contacting the carrier with an ion-exchange resin that forms an ammonium salt with the axial base and fixes it to the ion-exchange resin; (b) distilling or subliming the axial base away from the carrier in the solid state by applying mild heat and vacuum in a regeneration vessel; and (c) contacting the cobalt ligand form of the carrier with a transition metal compound that has a stronger affinity for the axial base than does cobalt.

In the ion-exchange method of removing axial base, a strong acid ion-exchange column may be prepared by filling the column with an ionic resin that contains ion-exchange sites such as carboxylate or sulfonate sites, preferably the latter. The resin is converted to the acid form by passing a 1N solution of $H_2SO_4$ through the column. The column is then rinsed of excess acid by passing deionized water through the column until the pH of the eluate is greater than 5.0. The column may then be dried by rinsing with acetone, followed by rinsing with a solvent for the carrier, such as o-DCB. Degraded carrier solution may then be passed through the column. The basic axial base molecules coordinated to the inactive oxygenated-carrier species will be protonated by the acidic ion-exchange sites, producing a protonated axial base that does not coordinate with the carrier but is strongly associated to the sulfonate groups of the ion-exchange resin. With removal of the axial base, oxygen is released from the inactive carrier and the uncoordinated carrier, along with carrier solvent, passes through the column. Residual carrier is then washed from the column with additional carrier solvent. The uncoordinated carrier may then be converted to the active form by adding a fresh supply of axial base.

Axial base may also be removed from inactive oxygenated-carrier species by sublimation or by distillation. The sublimation technique is possible only with axial bases such as DMAP that are a solid at or near ambient temperature and that show sublimation behavior. Degraded carrier solution may be placed in a vacuum regeneration vessel and a vacuum applied to remove the solvent by vacuum distillation. When the solvent has been removed, a solid mass of oxygenated-carrier species and excess axial base remains. The excess axial base and the axial base coordinated to the oxygenated-carrier species is removed from the solid mass by heating the regeneration vessel to a temperature below the melting point of the axial base, approximately 100° C. for DMAP, and, in the case of a liquid axial base, by heating above its boiling point. Axial base slowly sublimes or distills out of the solid mass and collects on the cooled portion of the regeneration vessel. With removal of the coordinated axial base, the oxygenated-carrier species rapidly disassociates to uncoordinated carrier and oxygen. Active carrier may then be recovered by recombining the uncoordinated carrier with recovered axial base.

A third method for removing axial base from inactive cobalt-based oxygenated-carrier species is to contact the solution of the degraded carrier with a transition metal ion that has a stronger affinity for the axial base than the cobalt-based oxygen carrier complex, such as Cu(II), Ni(II), Hg(II), Ag(I) and Cu(I). A suitable transition metal compound for removing axial base from cobalt-based oxygen carriers is copper (II) chloride. This method is particularly attractive when a suitable transition metal compound can be found that has low solubility in the solution of the oxygen carrier. In the case of copper (II) chloride, the complex will selectively remove axial base from the inactive oxygenated-carrier species, thus regenerating the carrier solution, and allow a copper-axial base complex to be separated from the carrier solution by simple filtration.

In connection with the fourth regeneration method, suitable strong acids include hydrochloric acid, sulfuric acid, phosphoric acid and trifluoroacetic acid. Suitable organic solvents for extraction include diethyl ether and halogenated hydrocarbons containing from 1 to 3 carbon atoms. Suitable solvents for recrystallization of the carrier include methanol, ethanol, propanol and acetonitrile.

EXAMPLE 1

The Schiff base complex Co(II)-3,5-di-t-butylsaltmen was prepared by first synthesizing the corresponding alicylaldehyde, then the saltmen ligand, and then converting the ligand to the metal chelate carrier.

3,5-di-t-butylsalicylaldehyde 2,4-di-t-butylphenol (75 g, 0.36 mole) was dissolved in 200 ml absolute ethanol in a 1 L round bottom flask equipped with a water-cooled condenser. Sodium hydroxide (82 g, 2.0 moles) was dissolved in 80 ml water and added while still hot to the solution of phenol. Chloroform (156 g, 1.31 mole) was added in 2 ml portions over a 45-minute period. The resulting yellow-brown mixture was stirred 1 hour while cooling to ambient temperature. The mixture was diluted with 500 ml of 1M sulfuric acid and extracted with 200 ml of dichloromethane. The organic layer was isolated in a separatory funnel and dried over anhydrous magnesium sulfate. The mixture was filtered and rotoevaporated to a thick syrup. The yield was 33%. The IR spectrum of the crude product showed the characteristic aldehyde carbonyl (C=O) stretching frequency at 1648 cm$^{-1}$. The product was used without further purification.

3,5-di-t-butylsaltmen

Crude 3,5-di-t-butylsalicylaldehyde (330 g crude material containing 109 g, 0.46 mole aldehyde) was diluted by 300 ml of absolute methanol. A solution of tetramethylethylenediamine dihydrochloride (tmen.HCL) (36.0 g, 0.19 mole) and triethylamine (40.5 g, 0.40 mole) in 60 ml methanol was added to the aldehyde. The mixture was heated to boiling for 30 minutes with stirring, forming a yellow precipitate. The mixture was cooled to ambient temperature, and after 3 hours the precipitate was collected by filtration. After rinsing with methanol and drying, 67 g (65% yield) of saltmen ligand was obtained. The IR spectrum showed the characteristic imine (C=N) stretching frequency at 1625 cm$^{-1}$.

Co(II)-3,5-di-t-butylsaltmen 3,5-di-t-butylsaltmen (15.0 g, 0.027 mole) and Cobalt-(II) acetate tetrahydrate (Co(II)OAc.4H$_2$O) (7.5 g, 0.030 mole) were refluxed in 600 ml methanol for 1.5 hours in a glove box with an argon atmosphere, cooled to ambient temperature, filtered, and suction dried at 80° C. in vacuo to obtain an 85% yield of dark red crystals.

EXAMPLE 2

The Schiff base complex Co(II)-5-t-amyl-3-t-butylsaltmen was prepared by first synthesizing the corresponding phenol, then the salicylaldehyde, then the saltmen ligand, and then converting the ligand to the metal chelate carrier.

4-t-amyl-2-t-butylphenol 4-t-amylphenol (80 g, 0.49 mole) was dissolved in 200 ml anhydrous trifluoroacetic acid (TFA). T-butyl alcohol (39 g, 0.53 mole) was added with stirring. The mixture was stoppered and stirred for 19 hours at ambient (~22° C.) temperature. The solution was then poured into 400 ml of 1M NaOH, and the resulting upper organic layer was isolated in a separatory funnel. The crude product was dried over anhydrous magnesium sulfate. The product, 4-t-amyl-2-t-butylphenol, was purified by eluting 35 g of the mixture the mixture with 60:40 hexanes:dichloromethane (v/v) in a 5×20 cm silica column and eluted with 300 to 700 ml of solvent and collected in aliquots of 50 ml. Aliquots showing a single spot by Thin Layer Chromatography (TLC) (on silica eluted with 60:40 hexanes:dichloromethane (v/v)) were combined and rotoevaporated to a thick syrup. The yield was 39%.

5-t-amyl-t-butylsalicylaldehyde 4-t-amyl-2-t-butylphenol (53 g, 0.24 mole) was dissolved in 150 ml absolute ethanol in a 1 L round-bottom flask equipped with a water-cooled condenser. Sodium hydroxide (96 g, 2.4 moles) was dissolved in 100 ml water, and the hot solution was added to the solution of phenol. Chloroform (57 g, 0.48 mole) was added in 1 ml portions over a 45-minute period. The resulting yellow-brown mixture was stirred 1 hour as it cooled to ambient temperature. The mixture was diluted into 500 ml of 1M sulfuric acid and extracted with 200 ml chloroform. The organic layer was isolated in a separatory funnel and dried over anhydrous magnesium sulfate. The mixture was filtered and rotoevaporated to a thick syrup. The yield was 37%. The IR spectrum of the crude product showed a characteristic aldehyde carbonyl absorption. The product was used without further purification.

5-t-amyl-3-t-butylsaltmen

Crude 5-t-amyl-3-t-butylsalicylaldehyde (39 g crude material containing 14.5 g, 0.058 mole aldehyde) was diluted into 50 ml absolute methanol. A solution of tmen.2HCl (4.0 g, 0.021 mole) and triethylamine (4.3 g, 0.043 mole) in 10 ml methanol was added to the aldehyde. The mixture was heated to boiling for 1 hour with stirring, forming a yellow precipitate. The mixture was cooled to ambient temperature, and the yellow precipitate was collected by filtration. After rinsing with several milliliters of methanol and drying in vacuo at ambient temperature for 12 hours, 5.0 g (41% yield) of 5-t-amyl-3-t-butylsaltmen ligand was obtained. The IR spectrum showed the characteristic imine stretching frequency.

Co(II)-5-t-amyl-3-t-butylsaltmen 5-t-amyl-3-t-butylsaltmen (4.1 g, 0.0071 mole) and Co(II)OAc.4H$_2$O (2.0 g, 0.0080 mole) were refluxed in 40 ml of methanol for 2 hours in a glove box with an argon atmosphere, cooled, filtered, and suction-dried at 85° C. in vacuo to obtain a 94% yield of the red crystalline carrier.

EXAMPLE 3

The Schiff base complex Co(II)-3,5-di-t-amylsaltmen was prepared by first synthesizing the corresponding salicylaldehyde, then the saltmen ligand, and then converting the ligand to the metal chelate carrier.

3,5-di-t-amylsalicylaldehyde 2,4-di-t-amylphenol (70 g, 0.30 mole) was dissolved in 200 ml absolute ethanol in a 1 L round bottom flask equipped with a water-cooled condenser. Sodium hydroxide (82 g, 2.0 moles) was dissolved in 80 ml water and added while still hot to the solution of phenol. Chloroform (149 g, 1.25 moles) was added in 2 ml portions over a 45-minute period. The resulting yellow-brown mixture was stirred 2 hours while cooling to ambient temperature. The mixture was extracted into 400 ml of hexanes and the organic layer rinsed with 400 ml of 1M HCl. The organic layer was isolated in a separatory funnel and dried over anhydrous magnesium sulfate. The mixture was filtered and rotoevaporated to a thick syrup, and the IR spectrum of the crude product showed the characteristic aldehyde carbonyl stretching frequency. The product was used without further purification.

3,5-di-t-amylsaltmen

The saltmen ligand was synthesized from crude 3,5-di-t-amylsalicylaldehyde in substantially the same manner as in Example 1 to obtain a 99% yield. The IR spectrum showed the characteristic imine stretching frequency, while the UV-visible spectrum showed peaks at λmax=290 and 334 nm.

Co(II)-3,5-di-t-amylsaltmen 3,5-di-t-amylsaltmen (3.0 g, 0.0050 mole) and Co(II)OAc.4H$_2$O (1.4 g, 0.0056 mole) were refluxed in 50 ml of methanol for 2.5 hours in a glove box with an argon atmosphere, cooled, filtered and suction-dried at 80° C. in vacuo to obtain an 84% yield of the carrier.

EXAMPLE 4

The Schiff base complex Co(II)-3-t-butyl-5-t-octylsaltmen was prepared by first synthesizing the corresponding phenol, then the salicylaldehyde, then the saltmen ligand, and then converting the ligand to the metal chelate carrier.

2-t-butyl-4-t-octylphenol 4-t-octylphenol (160 g, 0.78 mole) was dissolved in 400 ml anhydrous TFA. T-butyl alcohol (94.3 g, 1.27 mole) was added with stirring. The mixture was stoppered and stirred for 24 hours at ambient (~22° C.) temperature. This solution was diluted with 600 ml water, and the resulting upper organic layer was isolated in a separatory funnel. The crude product, 2-t-butyl-4-t-octylphenol, was dried over anhydrous magnesium sulfate and purified by eluting 35 g of the mixture with 70:30 hexanes:dichloromethane (v/v) in a 5×20 cm silica column, then eluted with 300 to 700 ml of solvent and collected in aliquots of 50 ml. Aliquots showing a single spot by TLC on silica eluted with 70:30 hexanes:dichloromethane (v/v) were combined and rotoevaporated to a thick syrup for a yield of 54%.

3-t-butyl-5-t-octylsalicylaldehyde 2-t-butyl-4-t-octylphenol (140 g, 0.53 mole) was dissolved in 420 ml of absolute ethanol in a 3 L round bottom flask equipped with a water-cooled condenser. Sodium hydroxide (213 g, 5.3 moles) was dissolved in 200 ml water and added while still hot to the solution of phenol. Chloroform (127 g, 1.06 mole) was added in 2 to 3 ml portions over a 1 hour period. The resulting yellow-brown mixture was stirred for 1 hour while it cooled to ambient temperature. The mixture was diluted into 500 ml of 5M hydrochloric acid. The organic layer was isolated in a separatory funnel and dried over anhydrous magnesium sulfate. The mixture was filtered and rotoevaporated to a thick syrup to yield 26% crude product with an IR spectrum having the characteristic aldehyde carbonyl stretching frequency. The product was used without further purification.

3-t-butyl-5-t-octylsaltmen

Crude 3-t-butyl-5-t-octylsalicylaldehyde (125 g crude material containing 32.5 g, 0.11 mole aldehyde) was diluted to 125 ml with absolute methanol. A solution of tmen.2HCl (9.8 g, 0.052 mole) and triethylamine (11.0 g, 0.11 mole) in 50 ml methanol was added to the aldehyde. The mixture was heated to boiling for 30 minutes with stirring, forming a yellow precipitate. The mixture was cooled to ambient temperature, and the precipitate was collected by filtration. After rinsing with about 50 ml of methanol and drying in vacuo at ambient temperature for 12 hours, 23 g (67% yield) of ligand was obtained with an IR spectrum exhibiting the characteristic imine stretching frequency.

Co(II)-3-t-butyl-5-t-octylsaltmen 3-t-butyl-5-t-octylsaltmen (4.0 g, 0.006 mole) and Co(II)OAc.4H$_2$O (1.7 g, 0.007 mole) were refluxed in 100 ml of methanol for 2 hours in a glove box with an argon atmosphere, cooled, filtered and suction-dried at 80° C. in vacuo to obtain a 54% yield of the carrier.

EXAMPLE 5

The Schiff base complex Co(II)-5-t-butyl-3-(1-methylcyclohexyl)saltmen was prepared by first synthesizing the corresponding phenol, then the salicylaldehyde, then the saltmen ligand, and then converting the ligand to the metal chelate carrier.

4-t-butyl-2-(1-methylcyclohexylphenol 4-t-butylphenol (10.5 g, 0.070 mole) was dissolved in 40 ml anhydrous trifluoroacetic acid (TFA). 1-methylcyclohexanol (12.0 g, 0.105 mole) was added with stirring. The mixture was stoppered and stirred for 24 hours at ambient temperature. This solution was diluted to 125 with water, and the resulting yellow top organic layer was isolated in a separatory funnel. The organic layer was diluted to 100 ml with hexanes, washed with 75 ml of saturated sodium bicarbonate solution and isolated and dried over anhydrous magnesium sulfate. The product, 4-t-butyl-2-(1-methylcyclohexyl)phenol, was purified by eluting 20 g of the mixture with a 10-vol % solution of tetrahydrofuran in hexanes in a 5×25 cm silica column (J. T. Baker, 40–140 mesh), then eluted with 100 to 200 ml of solvent and collected in aliquots of 20 ml. Aliquots showing a single spot by TLC on silica eluted with a 10-vol % solution of tetrahydrofuran (THF) in hexanes, were combined and rotoevaporated to a thick syrup for a yield of 42%.

5-t-butyl-3-(1-methylcyclohexyl)salicylaldehyde 4-t-butyl-2-(1-methylcyclohexyl)phenol (7.0 g, 0.028 mole) was dissolved in 10 ml of absolute ethanol in a 100 ml round bottom flask equipped with a water-cooled condenser. Sodium hydroxide (11.4 g, 0.28 mole) was dissolved in 10 ml water and added while still hot to the solution of phenol. Chloroform (6.8 g, 0.057 mole) was added in 2 to 3 ml portions over a 10-minute period. The resulting brown mixture was stirred for 1 hour while it cooled to ambient temperature. The mixture was added to 25 ml of 5M hydrochloric acid. The organic layer was isolated in a separatory funnel and dried over anhydrous magnesium sulfate. The mixture was filtered and rotoevaporated to a thick syrup to an assumed yield of 30% of the crude product with an IR spectrum having the characteristic aldehyde carbonyl stretching frequency. The product was used without further purification.

5-t-butyl-3-(1-methylcyclohexyl)saltmen

Crude 5-t-butyl-3-(1-methylcyclohexyl)salicylaldehyde (5.0 g crude material containing 1.5 g, 5.5 mole aldehyde by 1H NMR) was diluted to 30 ml with absolute methanol. A solution of tmen.2HCl (0.52 g, 0.0027 mole) and triethylamine (0.56 g, 0.0055 mole) in 10 ml methanol was added to the aldehyde. The mixture was heated to boiling for 30 minutes with stirring, forming a yellow precipitate. The mixture was cooled to ambient temperature, and the precipitate was collected by filtration. After rinsing with about 15 ml of methanol and drying in vacuo at ambient temperature for 12 hours, 1.0 g of ligand (30% yield) was obtained with an IR spectrum exhibiting the characteristic imine stretching frequency.

Co(II)-5-t-butyl-3-(1-methylcyclohexyl)saltmen 5-t-butyl-3-(1-methylcyclohexyl)saltmen (0.55 g, 0.009 mole) and Co(II)OAc.4H$_2$O (0.24 g, 0.0010 mole) were refluxed in 20 ml methanol for 2 hours in a glove box with an argon atmosphere, cooled, and suction-dried at 80° C. in vacuo to obtain an 85% yield of the carrier.

EXAMPLE 6

The Schiff base complex Co(II)-3,5-di-t-butyl-saltmpen was prepared by converting the corresponding phenol to the salicylaldehyde in the same manner as in Example 1, then the saltmpen ligand from the salicylaldehyde, and then converting the ligand to the metal chelate carrier.

3,5-di-t-butylsaltmpen

Crude 3,5-di-t-butylsalicylaldehyde (32 g crude material containing approximately 10 g, 0.043 mole aldehyde) and triethyl amine (10.9 g, 0.11 mole) were dissolved in 20 ml absolute methanol. Trimethylpropylethylenediamine (4.1 g, 0.028 mole) was added with stirring and then heated to boiling for 15 minutes. The dark yellow solution was rotoevaporated to remove solvent, yielding a thick yellow syrup. The sample was chromatographed on a 2.5×20 cm silica column eluted with 9.5:0.5 hexanes:tetrahydrofuran. The solvent was removed by rotoevaporation and drying in vacuo. The yield was 1.0 g (6%). The IR spectrum showed the characteristic imine stretch, while the UV-visible spectrum showed peak at λmax=294 and 332 nm.

Co(II)-3,5-di-t-butylsaltmpen 3,5-di-t-butylsaltmpen (1.0 g, 0.0017 mole) and Co(II)OAc.4H$_2$O (0.88 g, 0.0035 mole) were refluxed under an argon atmosphere for one hour. The solution was cooled to room temperature overnight, forming an orange precipitate. The product was filtered, rinsed with 1 to 2 ml methanol and suction-dried to yield 0.28 g (25%) of the carrier.

EXAMPLE 7

The Schiff base complex Co(II)-3,5-di-t-butylsal-(1,2-dimethylcyclohexylene-1,2-diimine) is prepared by first synthesizing 3,5-di-t-butylsalicylaldehyde as in Example 1, then the ligand, and then converting the ligand to the carrier as in Example 1. The ligand is prepared by diluting 330 g crude 3,5-di-t-butylsalicylaldehyde (containing approximately 109 g, 0.46 mole aldehyde) with 300 ml absolute methanol, adding a methanol solution of 1,2-diamino-1,2-dimethylcyclohexane (28 g, 0.20 mole) while stirring, boiling for 30 minutes, cooling to ambient temperature, and filtering, washing with methanol, and drying in vacuo.

EXAMPLE 8

The Schiff base complex Co(II)-3-t-amyl-5-t-butyl-saltmen is prepared by first synthesizing the corresponding phenol, then the salicylaldehyde, then the saltmen ligand, and then converting the ligand to the metal chelate carrier.

2-t-amyl-4-t-butylphenol 4-t-butylphenol (73 g, 0.49 mole) is dissolved in 200 ml anhydrous trifluoroacetic acid (TFA). T-amyl alcohol (47 g, 0.53 mole) is added with stirring. The mixture is stoppered and stirred for 19 hours at ambient (~22° C.) temperature. The solution is then diluted into 400 ml of 1M NaOH, and the resulting upper organic layer is isolated in a separatory funnel. The crude product is dried over anhydrous magnesium sulfate. The product, 2-t-amyl-4-t-butylphenol, is purified by eluting 35 g of the mixture with 60:40 hexanes:dichloromethane (v/v) in a 5×20 cm silica column and eluted with 300 to 700 ml of solvent and collected in aliquots of 50 ml. Aliquots showing a single spot by Thin Layer Chromatography (TLC) (on silica eluted with 60:40 hexanes:dichloromethane v/v)) are combined and rotoevaporated to a thick syrup, typically giving a 40% yield.

3-t-amyl-5-t-butylsalicylaldehyde 2-t-amyl-4-t-butylphenol (53 g, 0.24 mole) is dissolved in 150 ml absolute ethanol in a 1 L round bottom flask equipped with a water-cooled condenser. Sodium hydroxide (96 g, 2.4 moles) is dissolved in 100 ml water, and the hot solution is added to the solution of the phenol. Chloroform (57 g, 0.48 mole) is added in 1 ml portions over a 45-minute period. The resulting yellow-brown mixture is stirred 1 hour as it cools to ambient temperature. The mixture is diluted into 500 ml of 1M sulfuric acid and extracted with 200 ml hexanes. The organic layer is isolated in a separatory funnel and dried over anhydrous magnesium sulfate. The mixture is filtered and rotoevaporated to a thick syrup. A typical yield for this reaction is 30%. The product is used without further purification.

3-t-amyl-5-t-butylsaltmen

Crude 3-t-amyl-5-t-butylsalicylaldehyde (48 g crude material containing 14 g, 0.056 mole aldehyde) is diluted into 50 ml absolute methanol. A solution of tmen.2HCl (4.0 g, 0.21 mole) and triethylamine (4.3 g, 0.043 mole) in 10 ml methanol is added to the aldehyde. The mixture is heated to boiling for 1 hour with stirring, forming a yellow precipitate. The mixture is cooled to ambient temperature, and the yellow precipitate is collected by filtration. The product is rinsed with several milliliters of methanol, suction-dried, and dried in vacuo at ambient temperature for 12 hours. A typical yield for this reaction is 40%.

Co(II)-3-t-amyl-5-t-butylsaltmen 3-t-amyl-5-t-butylsaltmen (4.1 g, 0.0071 mole) and Co(II)OAc.4H$_2$O (2.0 g, 0.0080 mole) are refluxed in 40 ml of methanol for 2 hours in a glove box with an argon atmosphere. The mixture is cooled to ambient temperature, filtered and suction-dried. The product is further dried for 6 hours at 85° C. in vacuo. A typical yield for this reaction is 90%.

The carriers of Examples 1–8 are summarized in Table 1 below, using the abbreviations for the $R_1$–$R_8$ substituents noted below:

t-Am=t-amyl
t-Bu=t-butyl
t-Oct=t-octyl
MCH=1-methylcyclohexyl
Me=methyl
Pr=propyl

TABLE 1

| Ex. No | $R_1$ | $R_2$ | $R_3$ | $R_4$ | $R_5$ | $R_6$ | $R_7$ | $R_8$ |
|---|---|---|---|---|---|---|---|---|
| 1 | t-Bu | t-Bu | t-Bu | t-Bu | Me | Me | Me | Me |

TABLE 1-continued

| Ex. No | $R_1$ | $R_2$ | $R_3$ | $R_4$ | $R_5$ | $R_6$ | $R_7$ | $R_8$ |
|---|---|---|---|---|---|---|---|---|
| 2 | t-Am | t-Am | t-Bu | t-Bu | Me | Me | Me | Me |
| 3 | t-Am | t-Am | t-Am | t-Am | Me | Me | Me | Me |
| 4 | t-Oct | t-Oct | t-Bu | t-Bu | Me | Me | Me | Me |
| 5 | t-Bu | t-Bu | MCH | MCH | Me | Me | Me | Me |
| 6 | t-Bu | t-Bu | t-Bu | t-Bu | Me | Me | Me | Pr |
| 7 | t-Bu | t-Bu | t-Bu | t-Bu | Me | Me | butylene | |
| 8 | t-Bu | t-Bu | t-Am | t-Am | Me | Me | Me | Me |

EXAMPLE 9

The oxygen-binding equilibrium constant, $KO_2$, was experimentally determined for the complexes of Examples 1–6 by measuring the decrease in internal pressure of a sealed vessel containing oxygen gas and stirred carrier solution. The carrier solution in each case comprised a solvent, an axial base and a Schiff base complex carrier. The concentration of axial base was generally 1.5 times the concentration of the carrier. The volume of the vessel was accurately known and was fitted with an electronic pressure transducer and magnetic stir bar. Carrier solution of known volume and concentration (approx. 2–10 ml and 0.01–0.5M) was added to the vessel, and the vessel sealed and briefly evacuated to remove air and to completely deoxygenate the carrier solution. Oxygen was introduced to the vessel, the vessel was resealed, and the internal pressure of the vessel was monitored at constant temperature and with stirring of the carrier solution.

The pressure decreased as oxygen dissolved in the carrier solution and reacted with the carrier. Equilibrium was reached in ½ to 3 hours when no further pressure decrease was noted. The equilibrium pressure of oxygen was known by direct measurement, the amount of oxygen reacted with carrier was calculated, using well known gas laws, from the gas volume, pressure change, and temperature, and the amount of carrier present was known. With these data, the equilibrium constant was calculated from the equilibrium equation (I) discussed above.

The solvents and axial bases used and other parameters of the tests are given in Table 2 below, with the carrier numbers corresponding to the carrier Examples set forth above.

TABLE 2

| Carrier No. | Solvent | Axial Base[1] | Carrier Conc. (M) | Temp. (°C.) | $KO_2$ (cmHg$^{-1}$) | Maximum Solubility[2] (M) |
|---|---|---|---|---|---|---|
| 1 | o-DCB | DMAP | 0.10 | 0 | 1.2 | 0.25 |
| 1 | o-DCB | " | 0.06 | 0 | 0.62 | 0.25 |
| 1 | o-DCB | " | 0.03 | 0 | 0.003 | 0.25 |
| 1 | o-DFB | " | 0.15 | 0 | 0.26 | — |
| 1 | o-DFB | " | 0.08 | 0 | 0.04 | — |
| 1 | Toluene | " | 0.15 | 0 | <2.0 | 0.15 |
| 1 | Toluene | " | 0.03 | 0 | >0.001 | 0.15 |
| 1 | o-Xylene | " | 0.10 | 0 | 2.0 | 0.15 |
| 1 | 1,4-DIB | " | 0.30 | 0 | 0.003 | 0.33 |
| 1 | 1,3-DIB | " | 0.10 | 0 | >0.001 | — |
| 1 | HB | " | 0.25 | 0 | 0.20 | 0.30 |
| 1 | Cyclosol 63 | " | 0.25 | 0 | 1.2 | 0.25 |
| 1 | Cyclosol 63 | " | 0.10 | 0 | >0.001 | 0.25 |
| 1 | MeN | " | 0.25 | 0 | <2.0 | 0.50 |
| 1 | MeN | " | 0.10 | 0 | >0.002 | 0.50 |
| 1 | FN | " | 0.13 | 0 | 2.0 | — |
| 1 | FN | " | 0.07 | 0 | 0.016 | — |
| 1 | TH | " | 0.30 | 0 | 0.23 | 0.40 |
| 1 | DHN | " | 0.18 | 0 | 0.002 | 0.20 |
| 1 | Shellflex 132 | DMAP | 0.05 | 0 | >0.001 | 0.05 |
| 1 | BuBz | " | 0.17 | 0 | 0.25 | 0.30 |
| 1 | Finsolv TN | " | 0.10 | 0 | 0.06 | — |
| 1 | PEPr | DMAP | 0.15 | 0 | 0.43 | 0.17 |
| 1 | o-DCB | " | 0.20 | 20 | 0.15 | 0.25 |
| 1 | MeN | " | 0.45 | 20 | 0.12 | 0.50 |
| 1 | THN | " | 0.40 | 20 | 0.12 | 0.40 |
| 1 | Cyclosol 63 | " | 0.25 | 20 | 0.11 | 0.25 |
| 1 | o-DCB | MOAPy | 0.30 | 0 | 0.017 | 0.30 |
| 1 | " | PoPy | 0.10 | 0 | 0.054 | 0.50 |
| 1 | " | MPP | 0.70 | 0 | 0.025 | 0.80 |
| 1 | " | MeIm | 0.60 | 0 | 0.050 | 0.70 |
| 1 | " | MeIm | 0.40 | 0 | 0.13 | 0.70 |
| 1 | Dodane H | " | 0.15 | 0 | 0.008 | 0.15 |
| 1 | IsoprN | " | 0.40 | 0 | 0.027 | 0.40 |
| 1 | Suresol 250 | " | 0.20 | 0 | 0.014 | 0.20 |
| 1 | Suresol 290 | " | 0.20 | 0 | 0.012 | 0.20 |
| 1 | IsoprN | " | 0.20 | 0 | 0.012 | 0.40 |
| 1 | Aromatic 200 | " | 0.25 | 0 | 0.18 | 0.25 |
| 1 | BA | " | 0.10 | 0 | 0.011 | 0.10 |
| 1 | BPA | " | 0.10 | 0 | 0.14 | 0.10 |
| 1 | BAA | " | 0.10 | 0 | 0.013 | 0.13 |
| 1 | MeN | MeIm | 0.50 | 0 | 0.011 | 0.50 |

TABLE 2-continued

| Carrier No. | Solvent | Axial Base[1] | Carrier Conc. (M) | Temp. (°C.) | $KO_2$ $(cmHg^{-1})$ | Maximum Solubility[2] (M) |
|---|---|---|---|---|---|---|
| 1 | " | DOA | 0.50 | 0 | 0.033 | 0.50 |
| 1 | " | TMG | 0.35 | 0 | 0.052 | 0.35 |

| | |
|---|---|
| DEPh | diethyl phthalate |
| DHN | decahydronaphthalene |
| DIB | diisopropylbenzene |
| DMAC | N,N-dimethylacetamide |
| DMAP | N,N-dimethylamino pyridine |
| DOA | N,N-dimethyloctylamine |
| Dodane H | branched $C_4$-$C_6$ alkylbenzene solvent, Monsato Co., Carson, CA |
| DPTS | 1,3-diphenyltetramethyldisiloxane |
| Finsolv TN | $C_{12}$-$C_{15}$ alkylbenzoate solvent, Fintex, Inc., Elwood Park, NJ |
| FN | 1-fluoronaphthalene |
| HB | hexylbenzene |
| IsoprN | 2-isopropylnaphthalene |
| MCT | monochlorotoluene |
| MeIm | 1-methylimidazole |
| MeN | 1-methylnaphthalene |
| MOAPy | 4-(N-methyl-N-octylamino)pyridine |
| MPP | 4-(4'-methylpiperidino)pyridine |
| NT | 2-nitrotoluene |
| o-DCB | ortho-dichlorobenzene |
| o-DFB | ortho-difluorobenzene |
| PEPr | 1-phenylethylpropionate |
| PoPy | 4-(1-pyrrolidino)pyridine |
| Shellflex 132 | hydrogenated alkylnaphthalene solvent, Shell Chemical Co., Houston, TX |
| Suresol 250 | monoisopropyl biphenyl solvent, Koch Chemical Co., Corpus Christi, TX |
| Suresol 290 | mono-sec.-butyl biphenyl solvent, Koch Chemical Co., Corpus Christi, TX |
| THN | 1,2,3,4-tetrahydronaphthalene |
| TMG | 1,1,3,3-tetramethylguanidine |

As seen from the entries in Table 2, the closer the carrier concentration is to its solubility limit, the more dramatic was the increase in the oxygen-binding constant $KO_2$. In addition, it was observed that mixtures of relatively poor solvents such as Shellflex 132 and Dodane H, with relatively good solvents such as 1-methylnaphthalene and 1,2,3,4-tetrahydronaphthalene gave less viscous solutions with lower carrier concentrations, yet high oxygen-binding constants.

EXAMPLE 10

A temperature-swing absorption/desorption process using an oxygen carrier solution of the present invention was carried out with the apparatus schematically shown in FIG. 1. Feed air was passed through a column 10 packed with $CO_2$ and $H_2O$ sorbents, then through cooling heat exchanger 12 to cool it to 0° C. The so-conditioned air was then percolated through a 750 ml packed sorption column 14 containing 0.45 L of 0.07M Co(II)-3,5-di-t-butylsaltmen and 0.28M DMAP in o-DCB as a solvent, causing oxygen-depleted air to exit the top of sorption column 14 through vent 15, while oxygen-loaded carrier solution was pumped from the bottom of the sorption column via line 16 and pump 18. Feed air flows were varied from 0.5 to 2.0 L/min. Oxygen depletion varied from 2.4 to 36%, corresponding to an oxygen concentration of the oxygen-depleted air of 13.4 to 20.5 mol %. The pump rate for the carrier solution was 50 ml/min. The temperature of the loaded solution was then increased to 70° C. with heat exchanger 20, then directed to a 250 ml gas/liquid separator 22 provided with a magnetic stir bar and stirrer 23, where oxygen was desorbed via vent line 24 and its purity monitored by a gas chromatograph. Liquid mixing and gas/liquid separation were aided by recirculation of carrier solution containing residual amounts of complexed oxygen via line 25 and diaphragm pump 26, at the rate of 200 ml/min. The level of carrier solution in separator 22 was controlled by a level sensor that in turn controlled variable speed pump 28 that emptied separator 22 at the rate of 50 ml/min. The oxygen-depleted carrier solution was then directed, via line 27 and variable speed gear pump 28, to cooling heat exchanger 30, where its temperature was lowered to 0° C., and then recycled to the top of sorption column 14 for reuse. Performance of the temperature-swing process over 300 hours is shown in Table 3.

TABLE 3

| Operating Time (hours) | Oxygen Product Purity (mole %) | Carrier Activity (% of Initial Activity) |
|---|---|---|
| 10 | 94 | — |
| 18 | 97 | — |
| 20 | 94 | — |
| 40 | 95 | — |
| 42 | 94 | 92 |
| 68 | 94 | — |
| 72 | 95 | — |
| 86 | 93 | — |
| 110 | — | 76 |
| * | * | * |
| 118 | 97 | — |
| 122 | 97 | 91 |
| 147 | 96 | — |
| 152 | 94 | — |
| 168 | 92 | — |
| 170 | 87 | 84 |
| 190 | 86 | 32 |
| 200 | 85 | — |
| ** | ** | ** |
| 208 | 88 | 91 |
| 226 | 84 | — |
| 252 | 81 | — |
| 270 | 82 | 82 |

TABLE 3-continued

| Operating Time (hours) | Oxygen Product Purity (mole %) | Carrier Activity (% of Initial Activity) |
|---|---|---|
| ••• | ••• | ••• |
| 276 | 89 | 93 |

\* carrier solution regenerated at 115 hours
\*\* carrier solution regenerated at 202 hours
\*\*\* carrier solution regenerated at 273 hours

EXAMPLE 11

Figure 4:
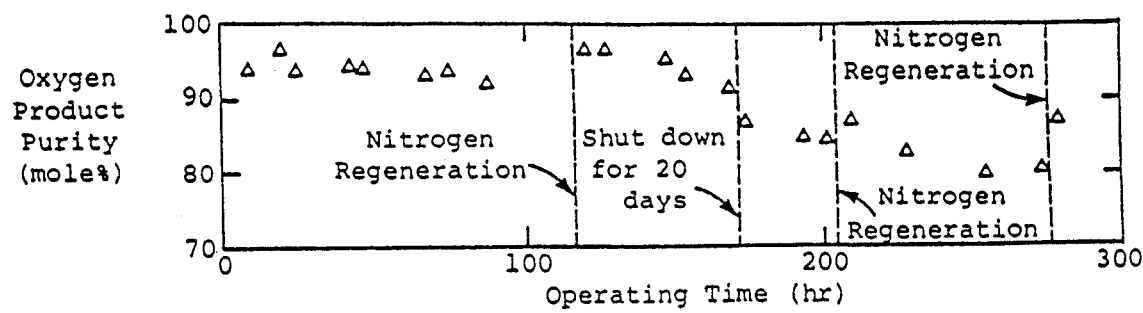
FIG. 4 is a graph showing oxygen product purity as a function of time over an extended period of operation of the temperature-swing absorption/desorption and carrier solution regeneration process of the present invention.
Figure 5:
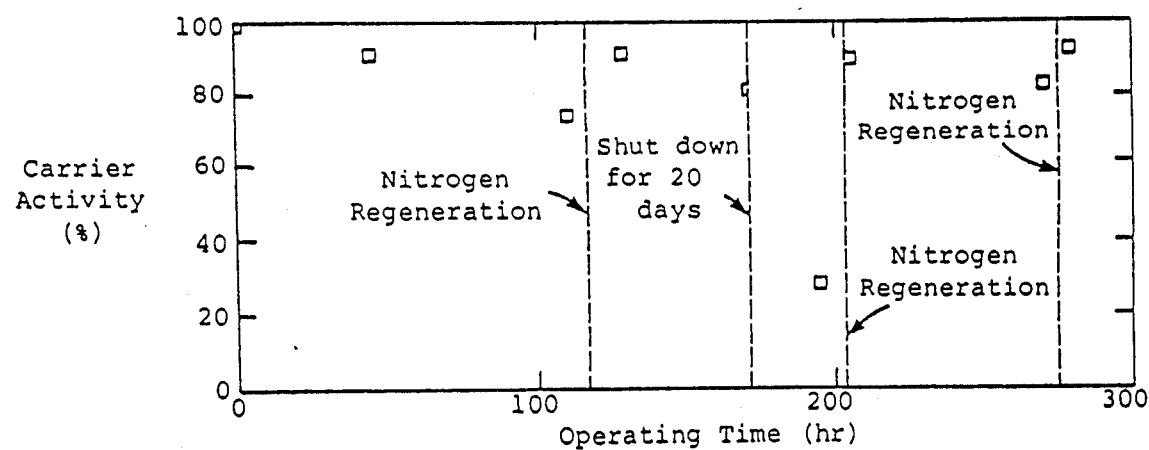
FIG. 5 is a graph showing oxygen carrier activity as a function of time over an extended period of operation of the temperature-swing absorption/desorption and carrier solution regeneration process of the present invention.

The oxygen production rate of the temperature-swing process of Example 10 decreased over time due to deactivation of the carrier solution. The oxygen-complexing activity of the carrier solution was periodically regenerated with the same apparatus by substituting substantially pure (97%) nitrogen for the feed air for up to 72 hours at 70° C. In this manner, the carrier solution, already devoid of water, was contacted with nitrogen in the sorption column 14, thus excluding oxygen. The small amount of nitrogen that dissolved in the o-DCB solvent was then desorbed in gas/liquid separator 22. In this manner, activity of the carrier was consistently restored to better than 95% of its original activity. Data from exemplary oxygen production and carrier regeneration cycles are shown in FIGS. 4 and 5, which show oxygen product purity and carrier activity over a 300-hour period of operation.

EXAMPLE 12

A pressure-swing absorption/desorption process using 0.6 L of substantially the same oxygen carrier solution of Example 10 was carried out with the apparatus schematically shown in FIG. 2. The dewpoint of atmospheric air was reduced to 0° C. with a heat exchanger/dryer 13, then percolated through a 220 ml Snyder bubble cap sorption column 14. Feed air flow was maintained at approximately 1.5 L/min, oxygen depletion via line 15 was 8%, and oxygen concentration of the oxygen-depleted air exiting line 15 was 19.3 mol %. The oxygen-loaded carrier solution exited sorption column 14 under the force of a pressure gradient, through throttling valves 19a and 19b, then via spray head 23 into a 9.4 L glass column separator 22, the spray head being located about one-half way down the column. Carrier solution sprayed into the column was recirculated at 200 ml/min with diaphragm pump 28, with spent solution being drained via drain port 29. Liquid level in separator 22 was controlled by a level sensor which in turn operated servo valve 19b. The product stream 24 contained 84+% pure oxygen at a flow rate of 26 ml/min maintained by vacuum compressor 40. Spent carrier solution was recycled to sorption column 14 at 350 ml/min for reuse via diaphragm pump 26.

EXAMPLE 13

Figure 3:
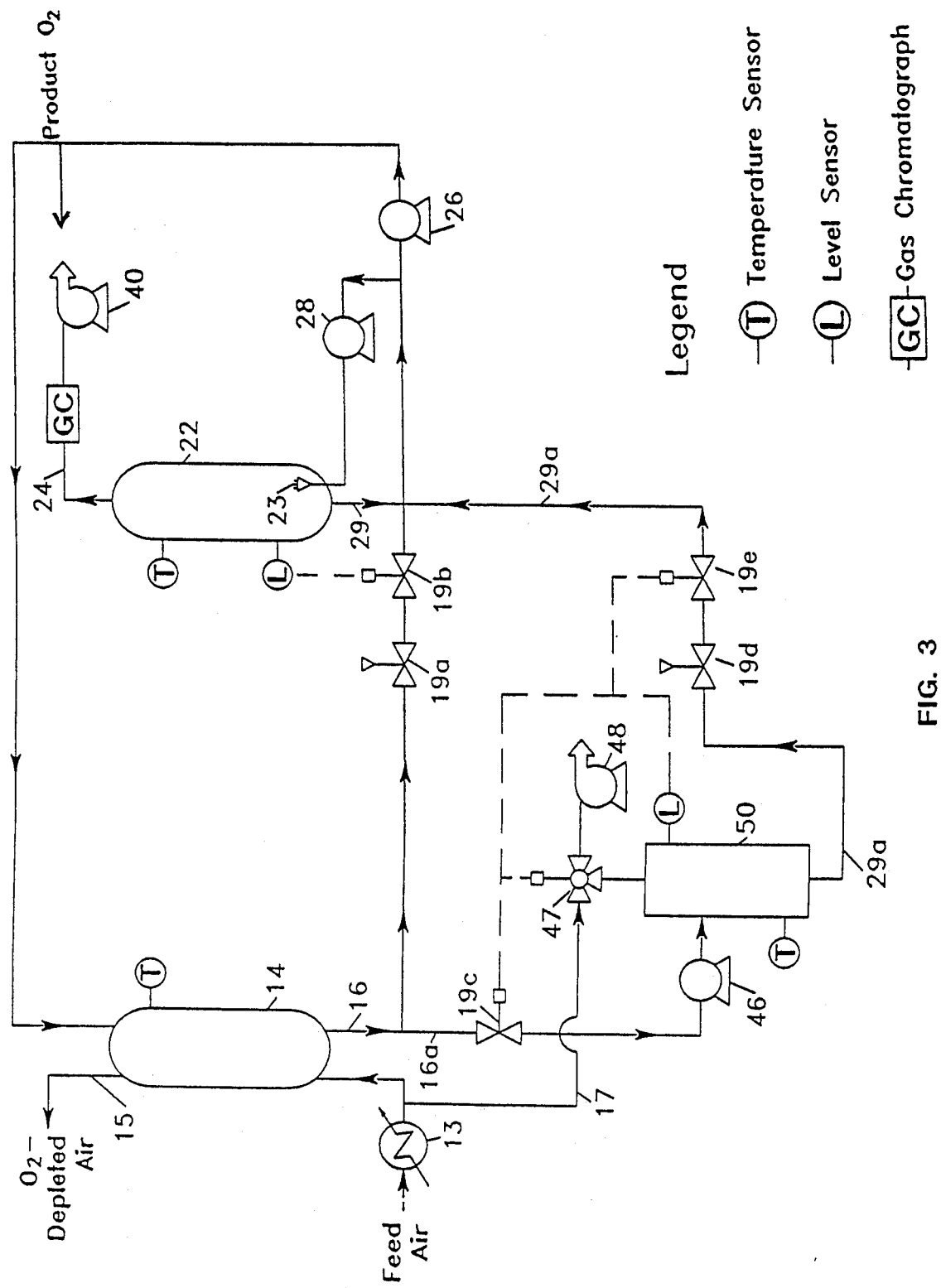
FIG. 3 is a schematic of exemplary apparatus used in the pressure-swing absorption/desorption and carrier solution regeneration process of the present invention.

The apparatus of FIG. 2 was modified as shown in FIG. 3 for purposes of periodically regenerating the oxygen-complexing activity of the carrier solution. As shown in FIG. 3, a portion of carrier solution periodically could be diverted through lines 16 and 16a by opening valve 19c to diaphragm pump 46 operatively connected to regenerator vessel 50. When the regenerator 50 was filled with carrier solution (sensed and controlled by a level sensor connected to valve 19c), a vacuum of 1 cmHg was applied thereto with vacuum pump 48 operatively connected to the regenerator vessel via valve/sample port 47. Oxygen was substantially excluded by application of the vacuum while the solution already devoid of water was heated to 100° C. for periods of time varying from 1 to 4 hours, after which time heating was discontinued and dry air was admitted to the regenerator vessel 50 from heat exchanger/dryer 13 and line 17. Regenerated carrier solution then flowed out of the regenerator vessel 50 under the force of a pressure gradient through line 29a and throttling valves 19d and 19e into gas/liquid separator 22, where it rejoined the oxygen production cycle.

The results of periodic regeneration of 0.1M Co(II)-3,5-di-t-butylsaltmen and 0.15M DMAP in o-DCB solution are shown in Table 4. The solution was exposed to oxygen loading conditions of 1 atmosphere of air at a dew point of 0° C. for 70 days. The oxygen uptake activity of the carrier solution was monitored by periodic gas sorption measurements as described in Example 9. As the carrier solution oxygen uptake activity dropped to about 80% of the initial value, the solution was regenerated as described above. With regeneration, the carrier solution was returned to 99% of its original activity after 70 days exposure to oxygen loading and unloading.

TABLE 4

| Operating Time (hours) | Carrier Activity (% of Initial Activity) |
|---|---|
| 180 | 99 |
| 331 | 87 |
| 547 | 76 |
| \* | \* |
| 552 | 84 |
| 672 | 80 |
| \*\* | \*\* |
| 691 | 98 |
| 811 | 92 |
| 1008 | 87 |
| \*\*\* | \*\*\* |
| 1013 | 96 |
| 1236 | 88 |
| \*\*\*\* | \*\*\*\* |
| 1284 | 96 |
| 1627 | 87 |
| \*\*\*\*\* | \*\*\*\*\* |
| 1642 | 99 |

\* carrier solution regenerated at 550 hours
\*\* carrier solution regenerated at 694 hours
\*\*\* carrier solution regenerated at 1010 hours
\*\*\*\* carrier solution regenerated at 1282 hours
\*\*\*\*\* Carrier Solution Regenerated at 1637 hours

EXAMPLE 14

Inactive carrier showing no measurable oxygen uptake was isolated from the carrier solution of Example 10 by removing the o-DCB solvent by rotoevaporation to leave a dark residue containing DMAP and 4 g inactive Co(II)-3,5-di-t-butylsaltmen. The residue was transferred into a glove box containing an argon atmosphere. The residue was then combined with 50 ml absolute methanol and the mixture refluxed for approximately 2 hours. The mixture was then allowed to cool to ambient temperature for several hours. When the mixture was filtered through a glass frit, red crystals of Co(II)-3,5-di-t-butylsaltmen were obtained. The crystals were rinsed with 5-10 ml of absolute methanol and suction-dried on the frit. The carrier was dried further by heating to 80°-90° C. in vacuo for 6 hours, for a 50% yield. The recrystallized carrier was tested and found to be 100% active for oxygen uptake.

EXAMPLE 15

Inactive carrier was isolated from the inactive carrier solution of Example 10 in the same manner as Example 13 to leave a dark residue containing DMAP and 8.0 g inactive carrier. This residue was dissolved completely in 100 ml methylene chloride to form a dark red-brown homogeneous solution. To this solution was added 15 ml of 12M aqueous HCl, which was shaken in a separatory funnel for approximately 30 seconds, resulting in the formation of a yellow-green emulsion due to the removal of the Co(II) metal ion from the ligand. As the mixture sat undisturbed, the emulsion separated into two distinct layers: a dark green top aqueous HCl layer containing Co(II) ions and most of the DMAP as the hydrochloride salt (the DMAP being protonated by HCl to render it water soluble); and a yellow-green methylene chloride bottom layer containing all of the demetallated ligand. 100 ml additional water was added to facilitate the removal of the aqueous acid layer. The layers were separated in a separatory funnel and the isolated methylene chloride solution was washed two more times with 100 ml portions of water to remove the aqueous acid, Co(II) ions and DMAP salts. The methylene chloride layer was treated with approximately 5-10 g of anhydrous magnesium sulfate which absorbed any traces of water from the methylene chloride solution, then filtered through a glass frit to remove the magnesium sulfate. Methylene chloride was then removed by rotoevaporation, leaving a solid yellow-green residue which was primarily the ligand 3,5-di-t-butylsaltmen. The ligand was recrystallized by completely dissolving the impure ligand in 3 ml of methylene chloride (3 ml per gram of ligand), followed by addition of absolute methanol (6 ml per gram of ligand) with vigorous stirring. After a few minutes, the ligand crystallized out as a bright yellow solid and was collected by filtration and dried in vacuo for 6 hours at ambient temperature, to yield 3.0 g of ligand. 2.5 g of the recovered ligand was refluxed with 1.2 g Co(II)OAc.4H$_2$O in 70 ml methanol under an argon atmosphere for two hours to yield a dark red solution. After cooling to ambient temperature for several hours, the mixture was filtered through a glass frit to obtain dark red crystals of Co(II)-3,5-di-t-butylsaltmen. The crystals were dried in vacuo for several hours at 80°-90° C., yielding 2.4 g. The resulting carrier was tested for oxygen sorption and found to be 100% active.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A metallo Schiff base complex of the structural formula

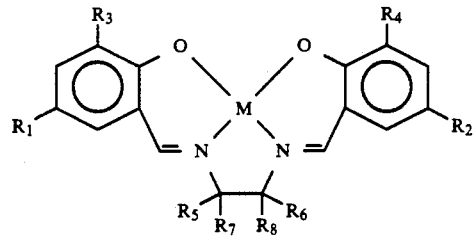

where

M is a +2 valence metal selected from Co, Fe, Cu, Ni, Mn, Ru and Rh;

$R_1$ and $R_2$ are selected from tertiary alkyl groups containing from 4 to 8 carbon atoms;

$R_3$ and $R_4$ are selected from $R_1$ and $R_2$ and 1-methyl-cyclohexyl;

$R_5$ and $R_6$ are selected from linear alkyl groups containing from 1 to 8 carbon atoms; and $R_7$ and $R_8$ are selected from $R_5$, $R_6$ and, taken together, a butylene group.

2. The complex of claim 1 wherein M is Co.

3. The complex of claim 1 wherein M is Co; $R_1$, $R_2$, and $R_3$ and $R_4$, are t-butyl; and $R_5$, $R_6$, $R_7$ and $R_8$ are methyl.

4. The complex of claim 1 wherein M is Co; $R_1$, $R_2$, $R_3$ and $R_4$ are t-amyl; and $R_5$, $R_6$, $R_7$ and $R_8$ are methyl.

5. The complex of claim 1 wherein M is Co; $R_1$ and $R_2$ are t-amyl; $R_3$ and $R_4$ are t-butyl; and $R_5$, $R_6$, $R_7$ and $R_8$ are methyl.

6. The complex of claim 1 wherein M is Co; $R_1$ and $R_2$ are t-butyl; $R_3$ and $R_4$ are t-amyl; and $R_5$, $R_6$, $R_7$ and $R_8$ are methyl.

7. The complex of claim 1 wherein M is Co; $R_1$ and $R_2$ are t-octyl; $R_3$ and $R_4$ are t-butyl; and $R_5$, $R_6$, $R_7$ and $R_8$ are methyl.

8. The complex of claim 1 wherein M is Co; $R_1$, $R_2$, $R_3$ and $R_4$ are t-butyl; $R_5$, $R_6$ and $R_7$ are methyl; and $R_8$ is propyl.

9. The complex of claim 1 wherein M is Co; $R_1$ and $R_2$ are t-butyl; $R_3$ and $R_4$ are 1-methylcyclohexyl; and $R_5$, $R_6$, $R_7$ and $R_8$ are methyl.

10. The complex of claim 1 wherein M is Co; $R_1$, $R_2$ and $R_3$ and $R_4$ are t-butyl; $R_5$ and $R_6$ are methyl; and $R_7$ and $R_8$, taken together, are butylene.

11. An oxygen-sorbing and -desorbing solution consisting essentially of a solvent, an axial base and a metallo Schiff base complex, said solvent being selected from linear and branched chain alkyl-, alkylene-, ester- and halogen-substituted aromatic hydrocarbons, mixtures thereof, and mixtures thereof with linear and branched-chain non-aromatic hydrocarbons, halocarbons, and esters, said axial base being capable of providing a coordinating atom to said metallo Schiff base complex, and said metallo Schiff base complex being of the structural formula

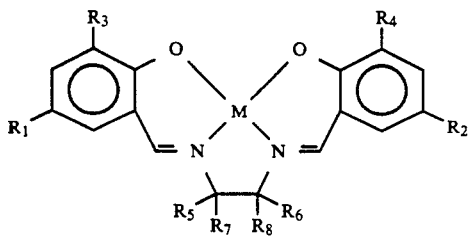

where

M is a +2 valence metal selected from Co, Fe, Cu, Ni, Mn, Ru and Rh;

$R_1$ and $R_2$ are selected from tertiary alkyl groups containing from 4 to 8 carbon atoms;

$R_3$ and $R_4$ are selected from $R_1$ and $R_2$ and 1-methylcyclohexyl;

$R_5$ and $R_6$ are selected from linear alkyl groups containing from 1 to 8 carbon atoms; and $R_7$ and $R_8$ are selected from $R_5$, $R_6$ and, taken together, a butylene group.

12. The solution of claim 11 wherein M is Co.

13. The solution of claim 11 wherein M is Co; $R_1$, $R_2$, $R_3$ and $R_4$ are t-butyl; and $R_5$, $R_6$, $R_7$ and $R_8$ are methyl.

14. The solution of claim 11 wherein M is Co; $R_1$, $R_2$, $R_3$ and $R_4$ are t-amyl; and $R_5$, $R_6$, $R_7$ and $R_8$ are methyl.

15. The solution of claim 11 wherein M is Co; $R_1$ and $R_2$ are t-amyl; $R_3$ and $R_4$ are t-butyl; and $R_5$, $R_6$, $R_7$ and $R_8$ are methyl.

16. The solution of claim 11 wherein M is Co; $R_1$ and $R_2$ are t-butyl; $R_3$ and $R_4$ are t-amyl; and $R_5$, $R_6$, $R_7$ and $R_8$ are methyl.

17. The solution of claim 11 wherein M is Co; $R_1$ and $R_2$ are t-octyl; $R_3$ and $R_4$ are t-butyl; and $R_5$, $R_6$, $R_7$ and $R_8$ are methyl.

18. The solution of claim 11 wherein M is Co; $R_1$, $R_2$, $R_3$ and $R_4$ are t-butyl; $R_5$, $R_6$ and $R_7$ are methyl; and $R_8$ is propyl.

19. The solution of claim 11 wherein M is Co; $R_1$ and $R_2$ are t-butyl; $R_3$ and $R_4$ are 1-methylcyclohexyl; and $R_5$, $R_6$, $R_7$ and $R_8$ are methyl.

20. The solution of claim 11 wherein M is Co; $R_1$, $R_2$, $R_3$ and $R_4$ are t-butyl; $R_5$ and $R_6$ are methyl; and $R_7$ and $R_8$, taken together, are butylene.

21. The solution of claim 11 wherein M is Co and the solvent is at least one of the group consisting essentially of lower alkyl-substituted benzene, orthodichlorobenzene, ortho-difluorobenzene, ortho-xylene, 1-ethylnaphthalene, 1-chloronaphthalene, 1-fluoronaphthalene, 1,2,3,4-tetrahydronaphthalene, butylbenzoate, and 1-phenylethylpropionate.

22. The solution of claim 11 wherein the concentration of the metallo Schiff base complex is such that, upon sorption of oxygen, phase separation of an oxygen-metallo Schiff base complex occurs.

23. The solution of claim 11 wherein the concentration of the metallo Schiff base complex is at least 80% of its solubility limit.

24. The solution of claim 11 wherein the solubility of the oxygenated form of the metallo Schiff base complex is one to two orders of magnitude less than the solubility of the non-oxygenated form.

25. The oxygen-sorbing and -desorbing solution of claim 11 wherein the metallo Schiff base complex is Co(II)(3,5-di-t-butylsaltmen).

26. A process for the separation of oxygen comprising:

(a) contacting an oxygen-containing feed stream with a solution consisting essentially of a solvent, an axial base and an metallo Schiff base complex, said solvent being selected from linear and branched chain alkyl-, alkylene-, ester- and halogen-substituted aromatic hydrocarbons, mixtures thereof, and mixtures thereof with linear and branched-chain non-aromatic hydrocarbons, halocarbons, and esters, said axial base being capable of providing a coordinating atom to said metallo Shiff base complex, and said metallo Schiff base complex being of the structural formula

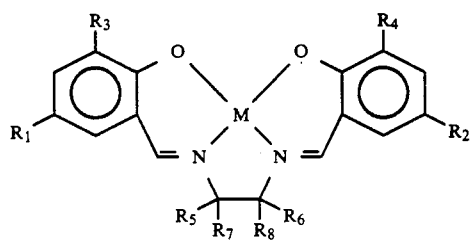

where

M is a +2 valence metal selected from Co, Fe, Cu, Ni, Mn, Ru and Rh, $R_1$ and $R_2$ are selected from tertiary alkyl groups containing from 4 to 8 carbon atoms;

$R_3$ and $R_4$ are selected from $R_1$ and $R_2$ and 1-methylcyclohexyl;

$R_5$ and $R_6$ are selected from linear alkyl groups containing from 1 to 8 carbon atoms; and $R_7$ and $R_8$ are selected from $R_5$, $R_6$ and, taken together, a butylene group, thereby sorbing oxygen from said feed stream; and (b) desorbing oxygen from said solution to a product stream.

27. The process of claim 26 wherein said feed stream is air.

28. The process of claim 26 wherein said product stream is a gaseous product stream.

29. The process of claim 26 wherein oxygen desorbed from said solution to said product stream is collected.

30. The process of claim 26 wherein said desorbing of oxygen is accomplished by a method selected from:

(a) bringing said solution into contact with a gaseous product stream having an oxygen partial pressure substantially less than that of said feed stream;

heating said solution; and (c) a combination of (a) and (b).

31. The process of claim 26 wherein the concentration of the metallo Schiff base complex is such that, upon sorption of oxygen, phase separation of an oxygen-metallo Schiff base complex occurs.

32. The process of claim 26 wherein the concentration of the metallo Schiff base complex is at least 80% of its solubility limit.

33. The process of claim 26 wherein the solubility of the oxygenated form of the metallo Schiff base complex is one to two orders of magnitude less than the solubility of the non-oxygenated form.

34. The process of claim 26, including regeneration of deactivated metallo Schiff base complex.

35. A method of reactivating the oxygen-sorbing and -desorbing capability of a solution consisting essentially of a solvent, an axial base and an metallo Schiff base complex, said solvent being selected from linear and branched chain alkyl-, alkylene-, ester- and halogen-substituted aromatic hydrocarbons, mixtures thereof, and mixtures thereof with linear and branched-chain non-aromatic hydrocarbons, halocarbons, and esters, said axial base being capable of providing a coordinating atom to said metallo Schiff base complex, and said metallo Schiff base complex being of the structural formula

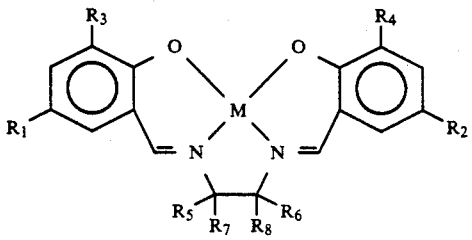

where M is a +2 valence metal selected from
Co, Fe, Cu, Ni, Mn, Ru and Rh,
$R_1$ and $R_2$ are selected from tertiary alkyl groups containing from 4 to 8 carbon atoms,
$R_3$ and $R_4$ are selected from $R_1$ and $R_2$ and 1-methylcyclohexyl,
$R_5$ and $R_6$ are selected from linear alkyl groups containing from 1 to 8 carbon atoms, and
$R_7$ and $R_8$ are selected from $R_5$, $R_6$ and, taken together, a butylene group,
comprising heating the deactivated form of said solution at a temperature from 30° C. to 180° C. in the absence of water and oxygen.

36. The method of claim 35 wherein the absence of oxygen is obtained by conducting said heating under a vacuum.

37. The method of claim 35 wherein the absence of oxygen is obtained by conducting said heating in an atmosphere of inert gas.

38. The method of claim 37 wherein said inert gas is nitrogen.

39. The method of claim 37 wherein said inert gas in argon.

40. A method of reactivating the oxygen-carrying capability of a metallo Schiff base complex of the structural formula

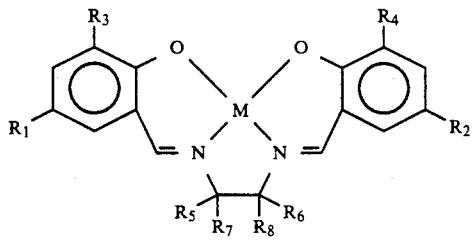

comprising
(a) dissolving the oxygenated and axial base-coordinated form of said metallo Schiff base complex in a hydrophobic solvent to form a solution thereof,
(b) contacting the solution formed in step (a) with an aqueous acid solution to strip M and axial base from said deactivated metallo Schiff base complex to form a solution of a ligand of the structural formula,

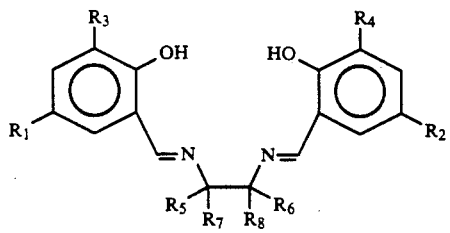

(c) recovering said ligand from the solution formed in step (b), and
(d) refluxing a nonaqueous solution of said ligand with a salt of M in the absence of oxygen to form the active form of an metallo Schiff base complex of said structural formula
where
M is a +2 valence metal selected from Co, Fe, Cu, Ni, Mn, Ru and Rh;
$R_1$ and $R_2$ are selected from tertiary alkyl groups containing from 4 to 8 carbon atoms;
$R_3$ and $R_4$ are selected from $R_1$ and $R_2$ and 1-methylcyclohexyl;
$R_5$ and $R_6$ are selected from linear alkyl groups containing from 1 to 8 carbon atoms; and
$R_7$ and $R_8$ are selected from $R_5$, $R_6$ and, taken together, a butylene group.

41. The method of claim 40 wherein said hydrophobic solvent used in step (a) is selected from methylene chloride, diethyl ether and halogenated hydrocarbons containing 1 to 3 carbon atoms.

42. The method of claim 40 wherein the acid of said aqueous acid solution of step (b) is a strong mineral acid.

43. The method of claim 42 wherein said strong mineral acid is hydrochloric acid.

44. The method of claim 40 wherein said recovering of step (c) is by recrystallization.

45. The method of claim 40 wherein the solvent of said nonaqueous solution of step (d) is selected from acetonitrile and alcohols containing from 1 to 3 carbon atoms.

46. The method of claim 40 wherein the absence of oxygen in step (d) is obtained by conducting said refluxing in an atmosphere of inert gas.

47. The method of claim 46 wherein said inert gas is selected from argon and nitrogen.

48. A method of reactivating the oxygen-carrying capability of a metallo Schiff base complex of the structural formula

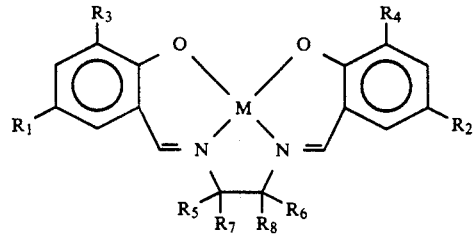

which has been deactivated by coordination of axial base thereto where
M is a +2 valence metal selected from Co, Fe, Cu, Ni, Mn, Ru and Rh,
$R_1$ and $R_2$ are selected from tertiary alkyl groups containing from 4 to 8 carbon atoms, $R_3$ and $R_4$ are selected from $R_1$ and $R_2$ and 1-methylcyclohexyl, $R_5$ and $R_6$ are selected from linear alkyl groups containing from 1 to 8 carbon atoms, and $R_7$ and $R_8$ are selected from $R_5$ and $R_6$ and, taken together, a butylene group, comprising removing coordinated axial base from the deactivated form of said metallo Schiff base complex.

49. The method of claim 48 wherein the method of removing coordinated axial base is by acidic ion exchange.

50. The method of claim 48 wherein the method of removing coordinated axial base is selected from sublimation and distillation.

51. The method of claim 48 wherein M is cobalt and the method of removing coordinated axial base is by contact with a transition metal ion having a stronger affinity for the axial base than does cobalt.

52. The method of claim 51 wherein said transition metal ion is selected from Cu(II), Ni(II), Hg(II), Ag(I) and Cu(I).

* * * * *

UNITED STATES PATENT AND TRADEMARK OFFICE
CERTIFICATE OF CORRECTION

PATENT NO. : 5,266,283                    Page 1 of 4

DATED : November 30, 1993

INVENTOR(S) : Dwayne T. Friesen, Warren K. Miller, Bruce M. Johnson and David J. Edlund It is certified that error appears in the above-indentified patent and that said Letters Patent is hereby corrected as shown below:

Col. 2, line 28: after "$R_5$" delete italicized "and $R_6$" and insert -- and $R_6$ -- without italics Col. 2, line 54: after "readily" insert -- dissolve --

Col. 5, line 10: delete "omatics" and insert -- aromatics --

Col. 8, line 57: after corresponding delete "alicylaldehyde" and insert -- salicyladehyde --

Col. 12, line 16: after "methylcyclohexyl" insert -- ) --

Col. 12, line 22: after "125" insert -- ml --

Col. 13, line 34: delete "peak" and insert -- peaks --

UNITED STATES PATENT AND TRADEMARK OFFICE
CERTIFICATE OF CORRECTION

PATENT NO. : 5,266,283

DATED : November 30, 1993

INVENTOR(S) : Dwayne T. Friesen, Warren K. Miller, Bruce M. Johnson, and David J. Edlund It is certified that error appears in the above-indentified patent and that said Letters Patent is hereby corrected as shown below:

Col. 16, Table 2: change "TH" to -- THN --

Col. 17, line 6, Table 2: insert -- the remainder of Table 2 --

TABLE 2 (Cont.)

| Carrier No. | Solvent | Axial Base[1] | Carrier Conc. (M) | Temp. (°C) | $KO_2$ (cmHg$^{-1}$) | Maximum Solubility[2] (M) |
|---|---|---|---|---|---|---|
| 1 | MCT | DMAP | 0.10 | 0 | 0.017 | - |
| 1 | NT | do | 0.10 | 0 | 0.15 | - |
| 1 | DEPh | do | 0.10 | 0 | 0.021 | - |
| 1 | DPTS | do | 0.10 | 0 | 0.011 | - |
| 1 | DMAC | do | 0.20 | -10 | 0.10 | - |
| 1 | o-DCB | do | 0.10 | 5 | 0.55 | 0.2 |
| 1 | do | do | 0.10 | 10 | 0.25 | 0.2 |
| 1 | do | do | 0.10 | 20 | 0.07 | 0.2 |
| 2 | do | do | 0.10 | -10 | 0.15 | 0.6 |
| 2 | do | MeIm | 0.10 | 0 | 0.01 | - |
| 2 | do | DMAP | 0.10 | 0 | 0.011 | 0.6 |
| 1 | do | MPP | 0.10 | 0 | 0.03 | 0.8 |
| 1 | do | TMG | 0.10 | 0 | 0.011 | 0.4 |
| 1 | 90% MeN 10% Shellflex | DMAP | 0.20 | 0 | 0.92 | 0.20 |
| 1 | 90% MeN 10% Dodane H | DMAP | 0.30 | 0 | 2.0 | 0.30 |
| 3 | o-DCB | do | 0.27 | 0 | 0.008 | 0.6 |
| 3 | o-DCB | do | 0.53 | 0 | 0.016 | 0.6 |
| 3 | Decane | MeIm[3] | 0.02 | -10 | 0.013 | 0.03 |
| 4 | do | do[3] | 0.04 | -10 | 0.06 | 1 |
| 4 | do | do[3] | 0.04 | 0 | 0.013 | 1 |
| 4 | o-DCB | DMAP | 0.04 | 0 | 0.01 | 0.5 |

UNITED STATES PATENT AND TRADEMARK OFFICE
CERTIFICATE OF CORRECTION

PATENT NO. : 5,266,283  Page 3 of 4

DATED : November 30, 1993

INVENTOR(S) : Dwayne T. Friesen, Warren K. Miller, Bruce M. Johnson, and David J. Edlund It is certified that error appears in the above-indentified patent and that said Letters Patent is hereby corrected as shown below:

TABLE 2 (Cont.)

| Carrier No. | Solvent | Axial Base[1] | Carrier Conc. ($\underline{M}$) | Temp. (°C) | $KO_2$ ($cmHg^{-1}$) | Maximum Solubility[2] ($\underline{M}$) |
|---|---|---|---|---|---|---|
| 5 | o-DCB | DMAP | 0.10 | 0 | 0.015 | 0.2 |
| 6 | Decane | do[4] | 0.03 | 0 | 0.02 | 0.035 |
| 6 | Decane | do[4] | 0.03 | -10 | 0.076 | 0.035 |
| 1 | o-DCB | do | 0.25 | 30 | 0.18 | 0.20 |
| 1 | 95% MeN 5% Dodane H | do | 0.30 | 0 | 0.36 | 0.35 |
| 1 | do | do | 0.35 | 20 | 0.02 | 0.35 |
| 1 | 90% MeN 10% Dodane H | do | 0.35 | 20 | 0.13 | 0.35 |
| 1 | 90% THN 10% | do | 0.35 | 20 | 0.12 | 0.35 |
| 1 | 80% THN 20% Dodane H | do | 0.30 | 20 | 0.13 | 0.30 |
| 1 | 70% THN 30% Shellflex 132 | do | 0.30 | 20 | 0.17 | 0.30 |

[1] Axial base:carrier = 1.5 unless otherwise noted
[2] At 25°C with axial base:carrier = 1.5
[3] Axial base:carrier = 25
[4] Axial base:carrier = 4.0

A list of the abbreviations used for solvents and axial bases in the Table 2 follows:

| | |
|---|---|
| Aromatic 200 | alkylbenzene solvent, Exxon Co., USA, Houston, TX |
| BA | benzyl acetate |
| BAA | benzyl acetoacetate |
| BPA | benzyl phenylacetate |
| BuBz | butylbenzoate |
| Cyclosol 63 | alkylbenzene solvent, Shell Chemical Co., Houston, TX |

UNITED STATES PATENT AND TRADEMARK OFFICE
CERTIFICATE OF CORRECTION

PATENT NO. : 5,266,283

DATED : November 30, 1993

INVENTOR(S) : Dwayne T. Friesen, Warren K. Miller, Bruce M. Johnson and David J. Edlund It is certified that error appears in the above-identified patent and that said Letters Patent is hereby corrected as shown below:

Col. 22, line 24: delete "and R8" and insert -- and $R_8$ --

Col. 22, line 29: delete "and" before "$R_3$"

Col. 24, line 52: insert -- (b) -- before "heating"

Signed and Sealed this

Twenty-seventh Day of September, 1994

Attest:

BRUCE LEHMAN

Attesting Officer    Commissioner of Patents and Trademarks